(12) United States Patent
Jhaveri

(10) Patent No.: US 11,146,833 B2
(45) Date of Patent: Oct. 12, 2021

(54) SYSTEMS AND METHODS FOR CAUSING A USER TO VIEW SECONDARY CONTENT THAT RELATES TO A MEDIA ASSET FROM WHICH A USER HAS SWITCHED AWAY

(71) Applicant: Rovi Guides, Inc., San Jose, CA (US)

(72) Inventor: Roma Jhaveri, Cerritos, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/918,105

(22) Filed: Jul. 1, 2020

(65) Prior Publication Data

US 2020/0344504 A1 Oct. 29, 2020

Related U.S. Application Data

(63) Continuation of application No. 16/233,345, filed on Dec. 27, 2018, now Pat. No. 10,743,040, which is a continuation of application No. 15/937,113, filed on Mar. 27, 2018, now Pat. No. 10,205,977, which is a continuation of application No. 15/333,911, filed on Oct. 25, 2016, now Pat. No. 9,961,378.

(51) Int. Cl.
| | |
|---|---|
| *H04N 21/81* | (2011.01) |
| *H04N 21/234* | (2011.01) |
| *H04N 21/442* | (2011.01) |
| *H04N 21/438* | (2011.01) |
| *H04N 21/44* | (2011.01) |
| *H04N 21/458* | (2011.01) |
| *H04N 21/8358* | (2011.01) |
| *H04N 21/435* | (2011.01) |

(52) U.S. Cl.
CPC .. *H04N 21/23424* (2013.01); *H04N 21/23406* (2013.01); *H04N 21/23418* (2013.01); *H04N 21/435* (2013.01); *H04N 21/4383* (2013.01); *H04N 21/44004* (2013.01); *H04N 21/44218* (2013.01); *H04N 21/44222* (2013.01); *H04N 21/458* (2013.01); *H04N 21/8358* (2013.01); *H04N 21/812* (2013.01)

(58) Field of Classification Search
None
See application file for complete search history.

(56) References Cited

U.S. PATENT DOCUMENTS

| | | |
|---|---|---|
| 6,239,794 B1 | 5/2001 | Yuen et al. |
| 6,564,378 B1 | 5/2003 | Satterfield et al. |
| 6,792,197 B1 | 9/2004 | Helmstetter |

(Continued)

*Primary Examiner* — Michael H Hong
(74) *Attorney, Agent, or Firm* — Haley Guiliano LLP

(57) ABSTRACT

Systems and methods are described herein for a media guidance application to determine that a user has switched away from a source transmitting a media asset with which the user was engaged and detect, while the user is switched away from the source, that secondary content transmitted by the source during a break of playback of the media asset relates to the media asset. In response to detecting that the secondary content relates to the media asset, the media guidance application may access a database to determine whether the secondary content specifically corresponds to the media asset, and, in response to determining that the secondary content specifically corresponds to the media asset, the media guidance application may generate for display the secondary content to the user.

20 Claims, 5 Drawing Sheets

(56) References Cited

U.S. PATENT DOCUMENTS

| | | |
|---|---|---|
| 7,165,098 B1 | 1/2007 | Boyer et al. |
| 7,761,892 B2 | 7/2010 | Ellis et al. |
| 8,046,797 B2 | 10/2011 | Bentolila et al. |
| 8,046,801 B2 | 10/2011 | Ellis et al. |
| 8,417,096 B2 | 4/2013 | Gharaat et al. |
| 9,788,024 B1 | 10/2017 | Wang et al. |
| 9,961,378 B1 | 5/2018 | Jhaveri |
| 2002/0174430 A1 | 11/2002 | Ellis et al. |
| 2005/0251827 A1 | 11/2005 | Ellis et al. |
| 2010/0153885 A1 | 6/2010 | Yates |
| 2010/0199299 A1 | 8/2010 | Chang et al. |
| 2011/0109801 A1 | 5/2011 | Thomas et al. |
| 2013/0347029 A1 | 12/2013 | Tang et al. |
| 2014/0164994 A1 | 6/2014 | Myslinski |
| 2016/0012475 A1* | 1/2016 | Liu .................... G06Q 30/0251 705/14.49 |

* cited by examiner

SYSTEMS AND METHODS FOR CAUSING A USER TO VIEW SECONDARY CONTENT THAT RELATES TO A MEDIA ASSET FROM WHICH A USER HAS SWITCHED AWAY

CROSS-REFERENCE TO RELATED APPLICATION

This application is a continuation of U.S. patent application Ser. No. 16/233,345, filed Dec. 27, 2018, which is a continuation of U.S. patent application Ser. No. 15/937,113, filed Mar. 27, 2018, now U.S. Pat. No. 10,205,977, which is a continuation of U.S. patent application Ser. No. 15/333,911, filed Oct. 25, 2016, now U.S. Pat. No. 9,961,378, the disclosure of which are hereby incorporated by reference herein in their entireties.

BACKGROUND

Media consumption has been growing at an exponential rate. As the mediums through which media is provided expand (e.g., from television, to Internet, and beyond), the entities that transmit primary media content have found an expanding array of ways to monetize the growing media consumption (e.g., by broadcasting secondary content during breaks in the primary content).

Consumers of primary content have grown weary of being exposed to secondary content during breaks in the primary content. Thus, related art systems have proliferated that are directed toward navigating a user away from secondary content and to, e.g., other primary content that the user may prefer. The related art systems, however, do not consider the possibility that a user may be caused to miss secondary content that the user in fact would prefer to be exposed to, and instead will always navigate the user away from the secondary content.

SUMMARY

Systems and methods are disclosed herein for causing a user to view secondary content that relates to a media asset from which a user has switched away. For example, if the user is viewing an episode of the program series "The Office" over a cable television channel, and that channel broadcasts secondary content during a break in the episode that shows a cliffhanger or other information that relates to that episode or would further the user's enjoyment of that episode, and if the user has switched away from the channel because the break began, the systems and methods provided herein would switch the user back to the channel. Thus, the systems and methods provided herein ensure that a user is exposed to secondary content relating to a media asset that the user enjoys even if the user had switched away from the primary content intentionally.

To this end, in some aspects of the disclosure, a media guidance application executed by control circuitry (e.g., of a user equipment) may determine that a user is engaged in viewing a media asset. For example, the media guidance application may determine that user equipment is tuned to a specific channel at a specific time, and may determine that the user has been fixated on the display of a media asset generated for display by the user equipment for a sufficient amount of time.

In some embodiments, the media guidance application may determine that the user is engaged in viewing the media asset by monitoring, using a biometric instrument, a level of attention that the user is paying to the media asset. For example, the media guidance application may use a camera to determine for what percentage of playback of a segment of the media asset the user's eyes are directed to a display of the media asset. The media guidance application may determine that the level of attention exceeds a threshold (e.g., the eyes were directed to the display for a threshold period of time), in response to determining that the level of attention exceeds the threshold, the media guidance application may determine that the user is engaged in viewing the media asset.

In some embodiments, in response to determining that the user is engaged in viewing the media asset, the media guidance application monitor, during each break in the media asset, whether the user switches away from a source of the media asset. For example, the media guidance application may determine whether, during a break in the media asset in which secondary content is generated for display (e.g., a break between segments of an episode of "The Office"), the user has tuned to a different channel.

In some embodiments, the media guidance application may determine, based on the monitoring, that the user has switched away from the source of the media asset during a break in the media asset. Following from the example above, the media guidance application may determine that a user has in fact tuned to a channel different from the channel that is broadcasting the episode of "The Office" during a break in that broadcast.

In some embodiments, in response to determining that the user has switched away from the source during the break, the media guidance application may monitor secondary content transmitted by the source during the break for an indication that the secondary content is related to the media asset. For example, following from the example above, the media guidance application may monitor secondary content on the channel that is broadcasting "The Office" even after the user has tuned away from that channel. When monitoring, the media guidance application may seek to detect that a character from the episode of "The Office" that is being broadcast appears in the secondary content, or may seek to detect any other indication that the secondary content relates to the episode of "The Office."

In some embodiments, the media guidance application may monitor the secondary content transmitted by the source during the break for an indication that the secondary content is related to the media asset by identifying characteristics of the media asset (e.g., actors in a media asset, soundtrack of a media asset, audio of a media asset, and the like). The media guidance application may fingerprint a video frame of the secondary content to create a fingerprint, and may compare characteristics of the fingerprint to each of the characteristics of the media asset. For example, fingerprinting the media asset may involve sampling voices, images, characters, and the like of a segment of the media asset, and these characteristics may be compared to characteristics of the media asset. The media guidance application may then determine whether, based on the comparing, a match exists between a characteristic of the characteristics of the fingerprint and a characteristic of the characteristics of the media asset.

In some embodiments, the media guidance application may determine, based on detecting the indication during the monitoring, that the secondary content is related to the media asset. For example, the media guidance application may affirmatively detect that a character from the episode of "The Office" is present during the secondary content.

In some embodiments, in response to determining that the secondary content is related to the media asset, the media guidance application may determine a unique identifier corresponding to the secondary content. For example, the media guidance application may fingerprint the secondary content and then access an identifier reference data structure. The media guidance application may then compare unique attributes of the secondary content to attributes of entries of a secondary content database in order to determine what the secondary content is specifically directed to.

In some embodiments, the media guidance application may determine the unique identifier corresponding to the secondary content by accessing auxiliary information corresponding to the secondary content (e.g., information in a vertical blanking interval ("VBI") signal that indicates what the secondary content relates to). The media guidance application may determining a subject of the secondary content from the auxiliary information (e.g., a title of a media asset that the secondary content relates to), and may assign the subject of the secondary content to be the unique identifier.

In some embodiments, the media guidance application may determine, based on information of the identifier reference data structure, whether the unique identifier for the secondary content corresponds to an identifier of the media asset. For example, the media guidance application may perform this determination by comparing the subject to the identifier of the media asset, and then determining, based on the comparing of the subject to the identifier of the media asset, whether the subject of the secondary content describes the identifier of the media asset. For example, the media guidance application may determine whether the subject of the secondary content happens to be the specific episode of "The Office" that is being broadcast.

In some embodiments, the media guidance application may determine whether the subject of the secondary content describes the identifier of the media asset by identifying a title of the media asset, and by determining whether the subject of the secondary content is the title of the media asset. As an example, the media asset may be a single component of a larger collection of media assets (e.g., a single episode of "The Office," which is part of a large collection of episodes of "The Office"). Thus, the media guidance application may determine that the subject of the secondary content is the title of the media asset by determining that the subject of the media asset specifically identifies the complete title of the media asset, as opposed to a portion of the title shared among the larger collection of media assets.

In some embodiments, in response to determining that the unique identifier for the segment of the secondary content corresponds to the identifier of the media asset, the media guidance application may automatically switch back to the source to cause a generation for display of the secondary content to the user. For example, the media guidance application may tune back to the channel airing the episode of "The Office" to enable the user to view the secondary content that relates to that episode of "The Office."

In some embodiments, the media guidance application, further in response to determining that the secondary content is related to the media asset, may buffer the secondary content into a buffer. For example, the media guidance application may cause the secondary content to be buffered from substantially its beginning in order to be sure a user will be able to consume most or all of the secondary content. Thus, when automatically switching back to the source to cause a generation for display of the secondary content to the user, the media guidance application may switch to a beginning of the buffer (e.g., a time-shifted version of what is transmitted by the source) rather than to a live transmission of the source.

In some embodiments, the media guidance application may determine, during playback of the secondary content from the buffer, that transmission of the media asset has resumed from the source. For example, halfway through the buffered secondary content, the media guidance application may determine that the episode of "The Office" has resumed. Thus, in response to determining, during playback of the secondary content from the buffer, that transmission of the media asset has resumed from the source, the media guidance application may buffer the media asset in the buffer. Upon detecting the conclusion of playback of the secondary content, the media guidance application may play back the media asset from the buffer. This will ensure that consumption of the secondary content does not cause the user to miss any portion of the media asset.

In some aspects, the media guidance application may determine that a user has switched away from a source transmitting a media asset with which the user was engaged. The media guidance application may detect, while the user is switched away from the source, that secondary content transmitted by the source during a break of playback of the media asset relates to the media asset. In response to detecting that the secondary content relates to the media asset, the media guidance application may access a database to determine whether the secondary content specifically corresponds to the media asset. In response to determining that the secondary content specifically corresponds to the media asset, the media guidance application may generate for display the secondary content to the user.

DETAILED DESCRIPTION

Figure 1:
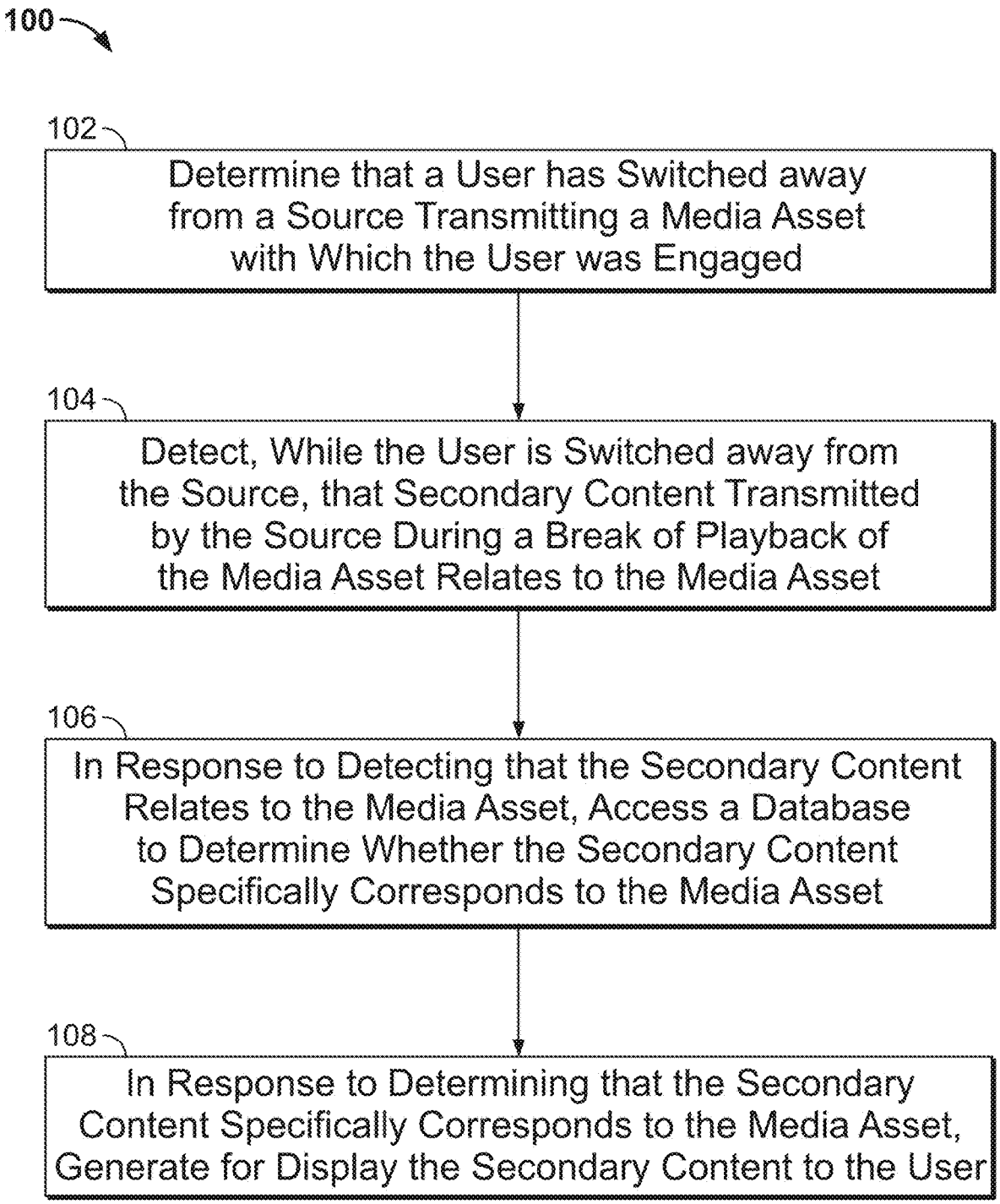
FIG. 1 depicts an illustrative flowchart of a process for switching back to a recently viewed source of a media asset a user was engaged in when secondary content is provided during a break in that media asset that relates to the media asset, in accordance with some embodiments of the disclosure.

FIG. 1 depicts an illustrative flowchart of a process for switching back to a recently viewed source of a media asset a user was engaged in when secondary content is provided during a break in that media asset that relates to the media asset, in accordance with some embodiments of the disclosure. Process 100 may be executed by a media guidance application that is run by control circuitry. Functionality of the media guidance application, the control circuitry, and the device(s) on which the control circuitry is implemented is discussed below with respect to FIGS. 2-5.

Process 100 begins at 102, where the media guidance application may determine that a user has switched away from a source transmitting a media asset with which the user was engaged. For example, the media guidance application may determine that a user has switched away from the channel NBC during a break in an episode of the television series "The Office." Manners in which the media guidance application may determine that a user has switched away from a source transmitting a media asset with which the user was engaged are described in further detail below with respect to FIGS. 6 and 7.

Process 100 continues to 104, where the media guidance application may detect, while the user is switched away from the source, that secondary content transmitted by the source during a break of playback of the media asset relates to the media asset. For example, while the user has switched away from the channel NBC, and is tuned to a different channel (e.g., the FOX channel), the media guidance application may continue to monitor secondary content transmitted on NBC. During this monitoring, the media guidance application may detect a teaser (e.g., secondary content that includes a cliffhanger for the present episode of "The Office") that shows what is going to happen after the break in the media asset. Manners in which this detection occurs is described in further detail below with respect to FIGS. 6-7.

Process 100 may continue to 106, where the media guidance application, in response to detecting that the secondary content relates to the media asset, may access a database to determine whether the secondary content specifically corresponds to the media asset. For example, if the secondary content includes a video frame including an actor from the television series "The Office," the media guidance application may then determine whether that secondary content is specifically directed to the episode that is presently airing on the media source that the user tuned away from (e.g., the NBC channel), as opposed to a different episode, or as apposed to the series "The Office" as a whole. Manners in which the determination of whether the secondary content specifically corresponds to the media asset are described in further detail below with respect to FIGS. 6-7.

Process 100 may continue to 108, where the media guidance application, in response to determining that the secondary content specifically corresponds to the media asset, may generate for display the secondary content to the user. For example, following from the "The Office" example above, the media guidance application may switch the channel back to NBC (and away from FOX) to ensure that the user does not miss the teaser pertaining to this specific episode of "The Office."

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
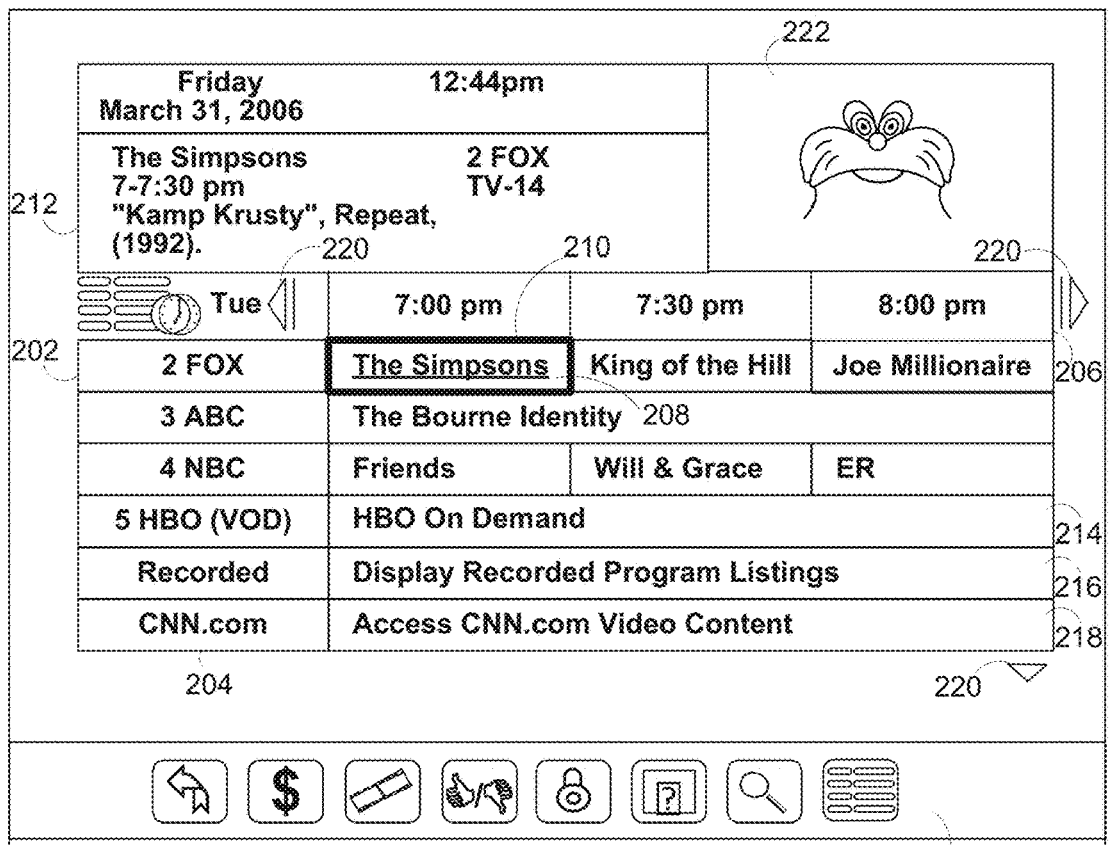
FIG. 2 shows an illustrative embodiment of a display screen that may be used to provide media guidance application listings and other media guidance information, in accordance with some embodiments of the disclosure.
Figure 3:
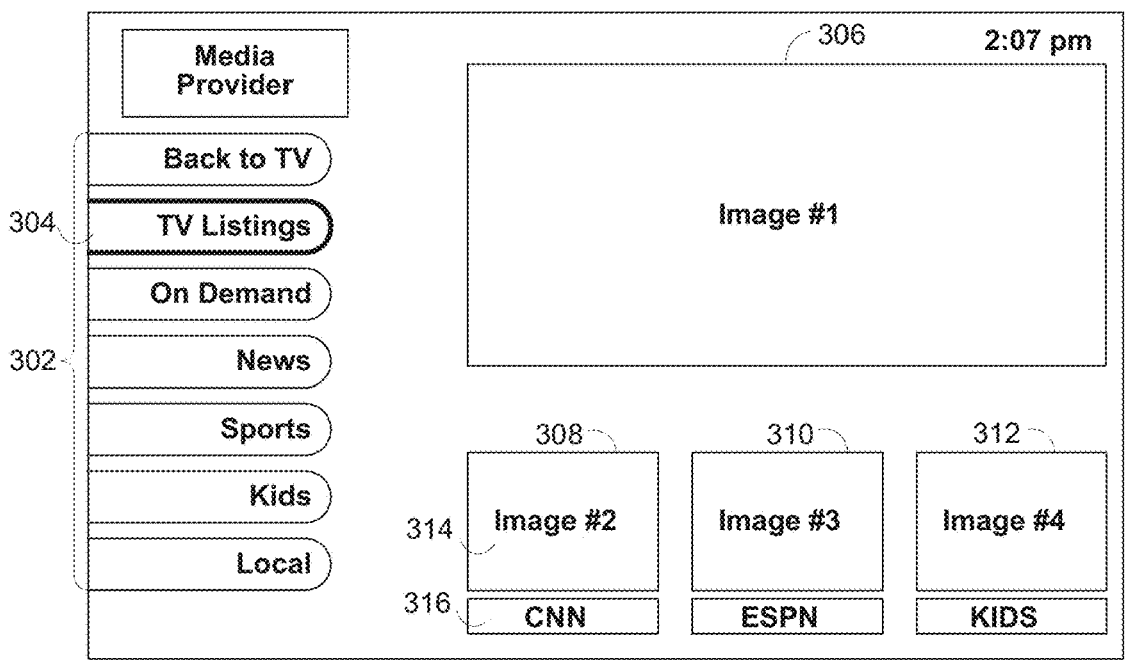
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
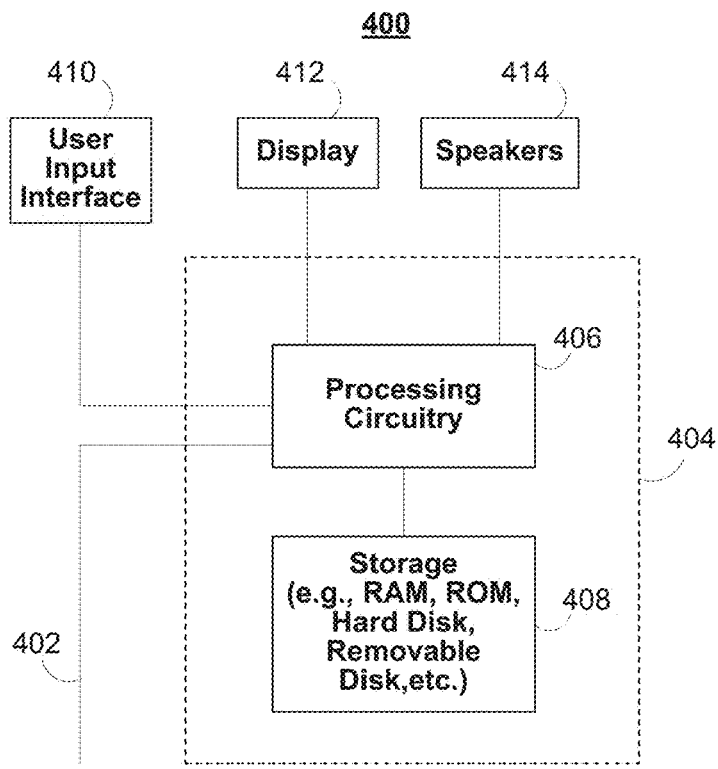
FIG. 4 is a block diagram of an illustrative user equipment (UE) device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
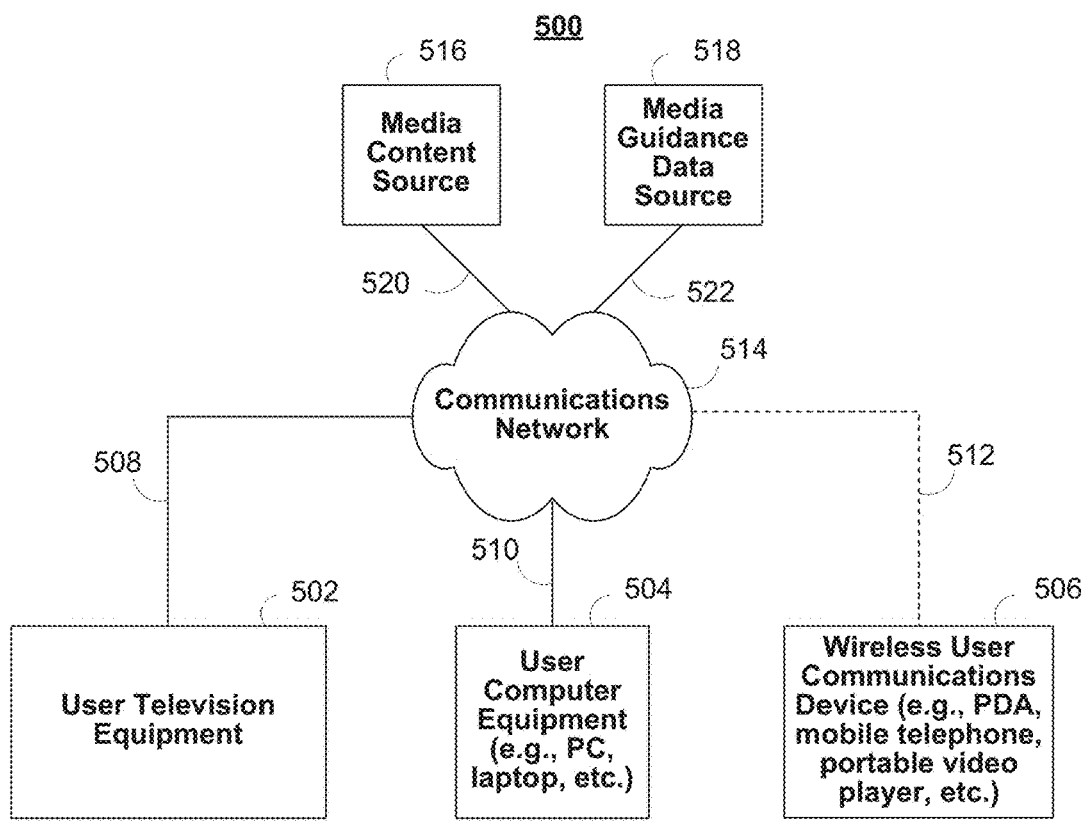
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and hand-held computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
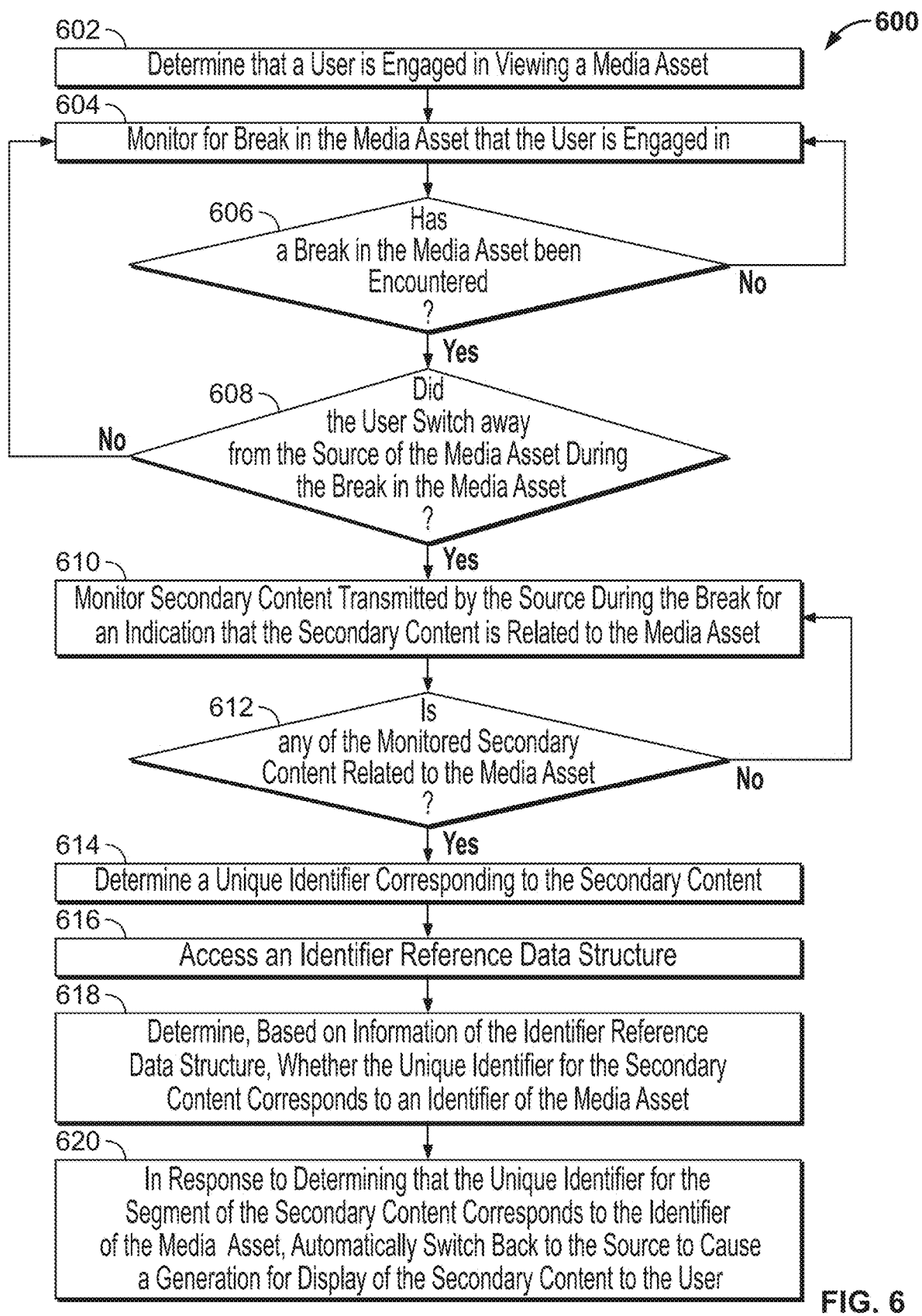
FIG. 6 depicts an illustrative flowchart of a process for switching back to a source of a media asset a user was engaged in when secondary content is provided during a break in that media asset that shares a unique identifier with the media asset, in accordance with some embodiments of the disclosure.

FIG. 6 depicts an illustrative flowchart of a process for switching back to a source of a media asset a user was engaged in when secondary content is provided during a break in that media asset that shares a unique identifier with the media asset, in accordance with some embodiments of the disclosure. The elements of process 600 may each be executed based on commands of a media guidance application. Each command of the media guidance application may cause control circuitry 404 to reactively perform an action, such as a processing or control activity relating to achieving an element of process 600. Control circuitry 404 may be implemented in user equipment (e.g., user television equipment 502, user computer equipment 504, and/or wireless user communications device 506), in a server that is reachable to user equipment by way of communications network 514, or spread across both user equipment and a server. The source may be media content source 516.

Process 600 begins at 602, where control circuitry 404 may determine that a user is engaged in viewing a media asset. The user may be viewing the media asset through any known means, such as broadcast television, on-demand television, playing back a recorded or otherwise stored copy of a media asset (e.g., a downloaded media asset), playing back a streaming version of the media asset (e.g., from a peer-to-peer connection or from a streaming video service such as Netflix), and the like.

The media guidance application may determine that the user is engaged in viewing the media asset by determining through any known means that a user has a threshold level of interest in the media asset. For example, a biometric instrument, such as a camera, may monitor a biometric reaction of a user, such as a percentage of time that a user's eyes are focused on the media asset, as opposed to some other object, to determine whether the user's eyes were focused on the media asset for a high enough percentage of time to form a conclusion that the user is in fact interested in the media asset. The threshold level of interest may be defined by an editor statically (i.e., the threshold level of interest applies equally for each person), or dynamically (i.e., as a function, where variables of the function point to portions of a user profile, so that the threshold level of interest is custom tailored to each user). An example of a dynamic threshold level of interest is, if a user's profile reflects that the user often does household chores during playback of the media asset and rarely sits down to focus on the media asset, a very small amount of time, such as sitting down and focusing on the media asset for 3 minutes of a 30 minute media asset, may reflect that the user is highly interested in the media asset. A user who rarely does secondary tasks when viewing a media asset and usually focuses for 28 minutes of a 30 minute media asset may have a threshold level of interest calculated to be at least 29 minutes of a 30 minute media asset, as anything lower reflects a lower-than-usual interest. Any function can be used, relying on any information of a user profile, to cause a dynamic assignment of a level of interest. The threshold level of interest may be stored in media guidance data source 518 and/or storage 408. Actual calculations of how engaged a user is in a media asset are further described in U.S. Pat. No. 8,046,797, issued Oct. 25, 2011, the contents of which are hereby incorporated by reference herein in their entirety.

Upon determining that a user is in fact engaged in a media asset, process 600 may continue to 604, where control circuitry 404 may monitor for a break in the media asset that the user is engaged in. Monitoring for a break in the media asset may be performed in any manner. For example, the media guidance application may detect a change in brightness or volume that exceeds a predefined amount, where the predefined amount is stored in media guidance data source 518 or storage 408. As another example, the media guidance application may detect an interval of blackness, where no video frame is present, and may determine based on that detection that a transition has occurred between the media asset and a break of the media asset. As another example, the media guidance application may utilize image recognition technology to determine that video transmitted by media content source 516 no longer includes characteristics of the media asset, such as the characters of the media asset, and instead includes other, unknown characters. The media guidance application may use any other means to monitor for a break in the media asset. Manners in which a transition to a break in a media asset may be detected are described in further detail in U.S. Pat. No. 6,792,197, issued Sep. 14, 2004, the contents of which are hereby incorporated by reference herein in their entirety.

Process 600 may continue to 606, where the control circuitry 404 may determine (e.g., during the monitoring) whether a break in the media asset has been encountered. If no break has been detected, process 600 will revert to 604, where control circuitry 404 will continue monitoring for a break. If a break, however, has been detected, process 600 continues to 608, where control circuitry 404 may determine whether the user switched away from the source of the media asset during the break in the media asset.

The media guidance application may determine whether the user has switched away from the source of the media asset in any manner. For example, in the case that the media asset is a broadcast television program, the media guidance application may determine that the user has switched away from the source of the media asset if the media guidance application detects that the user tunes away from the channel on which the media asset is being broadcast, and to a different channel on which the media asset is not being broadcast. As another example, if the media asset is streamed over an OTT application, such as a video streaming provider like Hulu, the media guidance application may detect that the user has switched to a different media asset using Hulu.

Alternatively, in some embodiments, the media guidance application may detect that the user has become disengaged or disinterested in the media asset by detecting that the user is using a different device to consume different media. For example, the media guidance application may not detect that the user has switched away from the source of the media asset, but has in fact used a device different from the device on which the media asset is generated for display to consume other media. In this case, the media guidance application may react in the same manner in which the media guidance application reacts when it detects that the user has switched away from the source of the media asset.

Upon determining that the user did in fact switch away from the source of the media asset during the break in the media asset, process 600 may continue to 610, where control circuitry 404 may monitor secondary content transmitted by the source during the break for an indication that the secondary content is related to the media asset. For example, the media guidance application may monitor for an indication that promotional content presented during in the break of the media asset actually relates to the media asset itself, as opposed to being a promotion for some other product or service. The media guidance application may monitor for the indication in any portion of the secondary content, be it video frames, textual information, metadata or other auxiliary information such as information in a VBI signal or information transmitted with a stream including the secondary content, or other auxiliary information such as third party information from third party data sources such as media guidance data source 518.

In order to monitor for this indication, the media guidance application may compare attributes of the media asset to any possible indication of relatedness to the media asset in the secondary content. As an example, if the media asset is an episode of the television series "The Office," the indication may be textual data within the secondary content that spells out "The Office," may be metadata that reflects that the title of the secondary content, at least in part, or spells out the text string "The Office." Similarly, actor information or any other information may be used to perform comparisons to detect a possible indication of relatedness. Other manners in which this detection may occur are described in further detail below with respect to FIG. 7.

At 612, control circuitry 404 determines whether any of the monitored secondary content is related to the media asset. If none of the monitored secondary content is related to the media asset, process 600 reverts back to 610, where the secondary content is continued to be monitored. If, however, secondary content is in fact detected that is related to the media asset, process 600 continues to 614, where control circuitry 404 may determine a unique identifier corresponding to the secondary content.

As used herein, the term unique identifier corresponding to the secondary content is used to refer to any identifier of the secondary content that can be used to identify the secondary content, or the subject of the secondary content, unambiguously. For example, if the secondary content is a teaser for a specific episode of the television series "The Office," a unique identifier is an identifier that indicates that the teaser relates to the specific episode, as opposed to an identifier that generically relates to the series or title "The Office," which would not specifically, and unambiguously, identify the episode.

The media guidance application may determine the unique identifier by comparing any detected identifier of the secondary content, or characteristics of a fingerprint of the secondary content, to data of entries of a database (e.g., media guidance data source 518). The media guidance application may determine how many entries have data that matches the detected identifier. If there is a single match, then the media guidance application may determine that the identifier is a unique identifier. If there is more than a single match, then the media guidance application may determine that the identifier is not a unique identifier, as the identifier instead likely broadly describes multiple secondary content.

Process 600 may continue to 616, where control circuitry 404 may access an identifier reference data structure. For example, the identifier reference data structure may include information that uniquely relates to the media asset itself (e.g., information that uniquely identifies the specific episode of "The Office").

Process 600 may continue to 618, where the control circuitry 404 may determine, based on information of the identifier reference data structure, whether the unique identifier for the secondary content corresponds to an identifier of the media asset. For example, the media guidance application may perform this determination by comparing the subject of the secondary content to the identifier of the media asset. As used herein, the term "subject," as used in relation to the term "secondary content," describes a topic to which the secondary topic is directed. For example, if the secondary content is designed to promote a product or service, that product or service is the "subject" of the secondary content. As another example, if the secondary content is designed to create suspense for a to-be-transmitted portion of a media asset, such as a segment of the media asset that is to resume after a break from the media asset, then the subject may be the media asset itself, or that segment of the media asset. The media guidance application may thus determine the unique identifier described above to be a subject of the media asset. Thus, the media guidance application may determine, based on the comparing of the subject to the identifier of the media asset, whether the subject of the secondary content describes the identifier of the media asset. For example, the media guidance application may determine whether the subject of the secondary content (which may be, e.g., a teaser for a specific episode of "The Office") happens to be the specific episode of "The Office" that is being broadcast.

In some embodiments, the media guidance application may determine whether the subject of the secondary content describes the identifier of the media asset by identifying a title of the media asset, and by determining whether the subject of the secondary content is the title of the media asset. As an example, the media asset may be a single component of a larger collection of media assets (e.g., a single episode of "The Office," which is part of a large collection of episodes of "The Office." Thus, the media guidance application may determine that the subject of the secondary content is the title of the media asset by determining that the subject of the media asset specifically identifies the complete title of the media asset, as opposed to a portion of the title shared among the larger collection of media assets.

Process 600 may, in response to determining that the unique identifier for the segment of the secondary content corresponds to the identifier of the media asset, proceed to 620, where control circuitry 404 may automatically switch back to the source to cause a generation for display of the secondary content to the user. For example, the media guidance application may tune back to the channel airing the episode of "The Office" to enable the user to view the secondary content that relates to that episode of "The Office." If the user is distracted using a different application or a different device, the media guidance application may alert the user, rather than automatically tuning the user back, to the fact that the secondary content is being transmitted by the source.

In some embodiments, the media guidance application, further in response to determining that the secondary content is related to the media asset, may buffer the secondary content into a buffer. For example, the media guidance application may cause the secondary content to be buffered from substantially its beginning in order to be sure a user will be able to consume most or all of the secondary content by using the buffered version of the secondary content. Thus, when automatically switching back to the source to cause a generation for display of the secondary content to the user, the media guidance application may switch to a beginning of the buffer (e.g., a time-shifted version of what is transmitted by the source) rather than to a live transmission of the source.

In some embodiments, the media guidance application may determine, during playback of the secondary content from the buffer, that transmission of the media asset has resumed from the source. For example, halfway through the buffered secondary content, the media guidance application may determine that the episode of "The Office" has resumed. Thus, in response to determining, during playback of the secondary content from the buffer, that transmission of the media asset has resumed from the source, the media guidance application may buffer the media asset in the buffer. Upon detecting the conclusion of playback of the secondary content, the media guidance application may play back the media asset from the buffer. This will ensure that consumption of the secondary content does not cause the user to miss any portion of the media asset. Manners in which a media asset may be buffered based on detection of secondary content is described in further detail in U.S. patent application Ser. No. 15/197,348, filed Jun. 29, 2016, currently pending, the contents of which are hereby incorporated by reference herein in their entirety.

Figure 7:
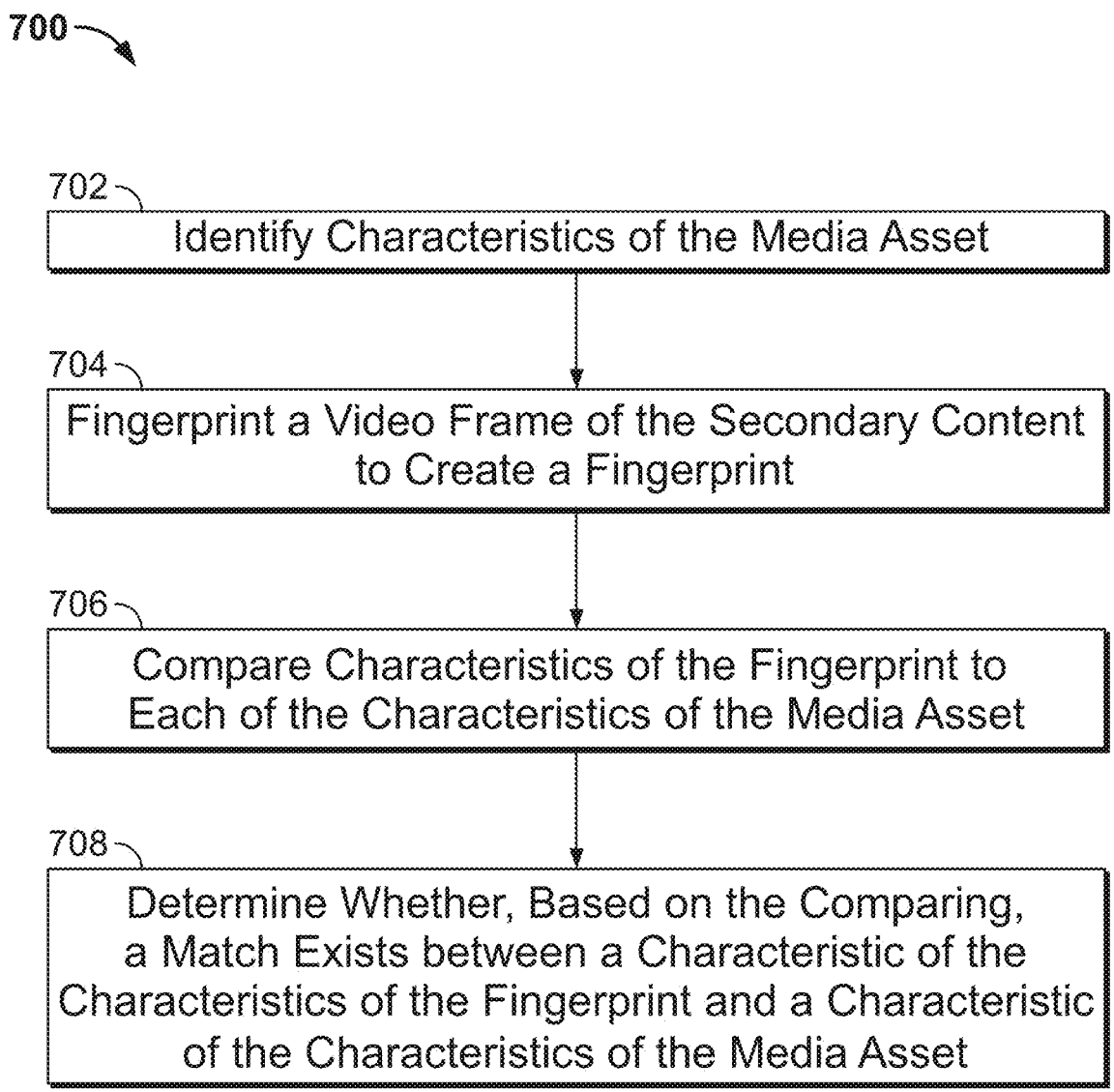
FIG. 7 depicts an illustrative flowchart of a process for determining whether secondary content provided during a break in a media asset shares a unique identifier with the media asset, in accordance with some embodiments of the disclosure.

FIG. 7 depicts an illustrative flowchart of a process for determining whether secondary content provided during a break in a media asset shares a unique identifier with the media asset, in accordance with some embodiments of the disclosure. The elements of process 700 may each be executed based on commands of a media guidance application. Each command of the media guidance application may cause control circuitry 404 to reactively perform an action, such as a processing or control activity relating to achieving an element of process 700. Control circuitry 404 may be implemented in user equipment (e.g., user television equipment 502, user computer equipment 504, and/or wireless user communications device 506), in a server that is reachable to user equipment by way of communications network 514, or spread across both user equipment and a server. Process 700 is an exemplary process for how 612 or 618 of process 600 may be implemented.

Process 700 begins at 702, where control circuitry 404 may identify characteristics of the media asset. Characteristics of the media asset may be identified in any manner. For example, control circuitry 404 may query a database such as media guidance data source 518 to learn various characteristics of the media asset (e.g., title, actor, director, year of release, and any other characteristic of the media asset). As another example, control circuitry 404 may identify characteristics of the media asset by identifying visual or audio characteristics of entities within the media asset, such as facial characteristics of an actor, characteristics of a setting in which a scene takes place, characteristics of a speaker's voice, and the like.

Process 700 continues to 704, where control circuitry 404 may fingerprint a video frame of the secondary content to create a fingerprint. Fingerprinting may involve any manner of reducing a media asset to a set of representative characteristics. As an example, control circuitry 404 may fingerprint the video frame by sampling video and/or audio characteristics of the video frame. As another example, control circuitry 404 may fingerprint the video frame by identifying a watermark within the video frame and storing it as a fingerprint. As another example, control circuitry 404 may fingerprint the video frame by identifying descriptive metadata or auxiliary data relating to the video frame.

Process 700 continues to 706, where control circuitry 404 may compare characteristics of the fingerprint to each of the characteristics of the media asset. For example, the representative characteristics of the media asset, such as an actor's facial characteristics, may be compared to characteristics of the fingerprint to determine whether those facial characteristics form a part of the fingerprint. Process 700 concludes at 708, where control circuitry 404 may determine whether, based on the comparing, a match exists between a characteristic of the characteristics of the fingerprint and a characteristic of the characteristics of the media asset.

Process 700 may apply to 618 by limiting the comparison of 706 to characteristics that uniquely identify the media asset (e.g., a set of unique identifiers of the media asset) against the fingerprint. Thus, a comparison of those characteristics that uniquely identify the media asset would only yield a match if the fingerprint reflects a unique characteristic.

It should be noted that processes 100 and 600-700 or any step thereof could be performed on, or provided by, any of the devices shown in FIGS. 4-5. For example, any of processes 100 and 600-700 may be executed by control circuitry 404 (FIG. 4) as instructed by control circuitry implemented on user equipment 502, 504, and/or 506 (FIG. 5) in order to switch between media sources. In addition, one or more steps of processes 100 and 600-700 may be incorporated into or combined with one or more steps of any other process or embodiment.

It is contemplated that the steps or descriptions of each of FIGS. 1 and 6-7 may be used with any other embodiment of this disclosure. In addition, the steps and descriptions described in relation to FIGS. 1 and 6-7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-5 could be used to perform one or more of the steps in FIGS. 1 and 6-7.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present invention may be executed using processing circuitry. For instance, switching between different media sources may be performed, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, a profile, as described herein, may be stored in, and retrieved from, storage 408 of FIG. 4, or media guidance data source 518 of FIG. 5. Furthermore, processing circuitry, or a computer program, may update settings associated with a user, such as a user's propensity to be engaged in a given media asset, stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
   determining that a first media asset is displayed on a first device;
   during a break in the first media asset:
      determining that the user is engaged with a second device, different from the first device;
      monitoring content displayed on the first device to determine that a second media asset is displayed on the first device, wherein the second media asset is related to the first media asset; and
      in response to (a) determining that the user is engaged with the second device and (b) that the that the second media asset that is related to the first media asset is displayed on the first device: transmitting an alert to the second device.

2. The method of claim 1, wherein the alert is based on the first media asset.

3. The method of claim 1, wherein the alert indicates the content second media is related to the first media asset is being transmitted displayed on the first device.

4. The method of claim 1, wherein the first media asset is a linear media asset and a media source for the first media asset is a linear media source.

5. The method of claim 1, wherein monitoring content displayed on the first device to determine that the second media asset is displayed on the first device comprises:
   determining a unique identifier corresponding to the second media asset;
   accessing, from metadata corresponding to the media asset, an identifier reference data structure; and
   determining, based on information of the identifier reference data structure, that the unique identifier for the second media asset corresponds to an identifier of the first media asset.

6. The method of claim 1, wherein monitoring content displayed on the first device to determine that the second media asset is displayed on the first device comprises:
   identifying characteristics of the first media asset;
   fingerprinting a video frame of the second media asset to create a fingerprint;
   comparing characteristics of the fingerprint to the characteristics of the first media asset; and
   determining, based on the comparing, that a match exists between a characteristic of the characteristics of the fingerprint and a characteristic of the first media asset.

7. The method of claim 1, wherein monitoring content displayed on the first device to determine that the second media asset is displayed on the first device comprises:
   monitoring, using a biometric device, a level of attention that the user is paying to the first media asset;
   determining that the level of attention exceeds a threshold; and
   in response to determining that the level of attention exceeds the threshold, determining that the user is engaged in viewing the first media asset.

8. The method of claim 5, wherein determining the unique identifier corresponding to the second media asset comprises:
   accessing auxiliary information corresponding to the second media asset;
   determining a subject of the second media asset from the auxiliary information; and
   assigning the subject of the second media asset to be the unique identifier.

9. The method of claim 5, wherein determining, based on information of the identifier reference data structure, that the unique identifier for the second media asset corresponds to the identifier of the media asset comprises:
   comparing a subject of the second media asset to the identifier of the first media asset; and
   determining, based on the comparing of the subject of the second media asset to the identifier of the first media asset, that the subject of the second media asset describes the identifier of the first media asset.

10. The method of claim 9, wherein determining that the subject of the second media asset describes the identifier of the first media asset comprises:
   identifying a title of the first media asset; and
   determining that the subject of the second media asset is the title of the first media asset.

11. A system comprising:

control circuitry configured to:

determine that a first media asset is displayed on a first device;

during a break in the first media asset:

determine that the user is engaged with a second device, different from the first device;

monitor content displayed on the first device to determine that a second media asset is displayed on the first device, wherein the second media asset is related to the first media asset; and in response to (a) determining that the user is engaged with the second device and (b) that the that the second media asset that is related to the first media asset is displayed on the first device:

transmit an alert to the second device.

12. The system of claim 11, wherein the alert is based on the first media asset.

13. The system of claim 11, wherein the alert indicates the content second media is related to the first media asset is being transmitted displayed on the first device.

14. The system of claim 11, wherein the first media asset is a linear media asset and a media source for the first media asset is a linear media source.

15. The system of claim 11, wherein the control circuitry is further configured, when monitoring content displayed on the first device to determine that the second media asset is displayed on the first device, to:

determine a unique identifier corresponding to the second media asset;

access, from metadata corresponding to the media asset, an identifier reference data structure; and determine, based on information of the identifier reference data structure, that the unique identifier for the second media asset corresponds to an identifier of the first media asset.

16. The system of claim 11, wherein the control circuitry is further configured, when monitoring content displayed on the first device to determine that the second media asset is displayed on the first device, to:

identify characteristics of the first media asset;

fingerprint a video frame of the second media asset to create a fingerprint;

compare characteristics of the fingerprint to the characteristics of the first media asset; and determine, based on the comparing, that a match exists between a characteristic of the characteristics of the fingerprint and a characteristic of the first media asset.

17. The system of claim 11, wherein the control circuitry is configured, when monitoring content displayed on the first device to determine that the second media asset is displayed on the first device, to:

monitor, using a biometric device, a level of attention that the user is paying to the first media asset;

determine that the level of attention exceeds a threshold; and in response to determining that the level of attention exceeds the threshold, determine that the user is engaged in viewing the first media asset.

18. The system of claim 15, wherein the control circuitry is configured, when determining the unique identifier corresponding to the second media asset, to:

access auxiliary information corresponding to the second media asset;

determine a subject of the second media asset from the auxiliary information; and assign the subject of the second media asset to be the unique identifier.

19. The system of claim 15, wherein the control circuitry is configured, when determining, based on information of the identifier reference data structure, that the unique identifier for the second media asset corresponds to the identifier of the media asset, to:

compare a subject of the second media asset to the identifier of the first media asset; and determine, based on the comparing of the subject of the second media asset to the identifier of the first media asset, that the subject of the second media asset describes the identifier of the first media asset.

20. The system of claim 19, wherein the control circuitry is configured, when determining that the subject of the second media asset describes the identifier of the first media asset, to:

identify a title of the first media asset; and determine that the subject of the second media asset is the title of the first media asset.

\* \* \* \* \*